Patented Oct. 17, 1950

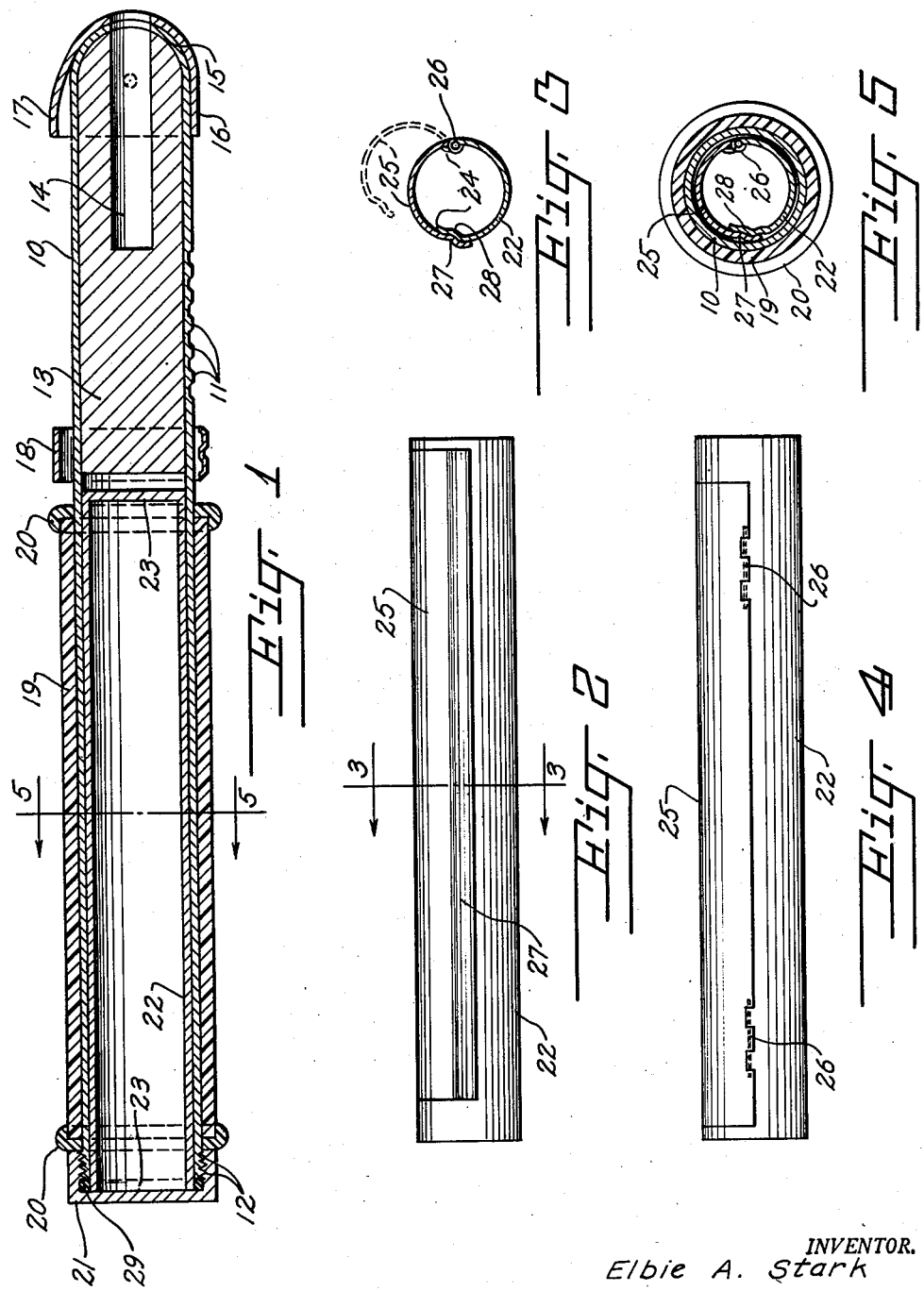

2,526,293

UNITED STATES PATENT OFFICE 2,526,293

FISHING ROD HANDLE

Elbie A. Stark, Gering, Nebr.

Application June 10, 1947, Serial No. 753,621

1 Claim. (Cl. 43—23)

This invention relates to improvements in fishing rod handles, and more particularly to a hollow handle having therein a receptacle for fishing accessories such as lines, hooks, flies, leaders, sinkers, matches, etc.

It is among the objects of the invention to provide an improved fishing rod handle with which a conventional rod may be readily assembled, which handle is of light weight, provides a comfortable hand grip and a convenient reel mounting, is hollow and includes an accessory receptacle which is easily removable from the handle at any time, is provided with a closure to preclude accidental spilling of its contents, and has a watertight seal with the hollow handle, and in which the handle is of simple construction, is economical to manufacture and has a neat and attractive appearance.

A somewhat more specific object resides in the provision of an improved hollow, elongated fishing rod handle providing a rod socket and reel mounting means on one end portion thereof and having a hollow portion adapted to receive an elongated accessory receptacle permanently secured to an end closure cap which fits upon the end of the handle opposite the end providing the rod socket and reel mount.

Other objects and advantages will become apparent from a consideration of the following description in conjunction with the accompanying drawing, wherein:

Figure 1 is a longitudinal cross-section of an improved fishing rod handle illustrative of the invention.

Figure 2 is a side elevation of a handle-included receptacle looking at the side of the receptacle at which the receptacle cover opens.

Figure 3 is a side elevation of the opposite side of the receptacle from that illustrated in Figure 2.

Figure 4 is a transverse cross-section on the line 3—3 of Figure 2; and

Figure 5 is a transverse cross-section on the line 5—5 of Figure 1.

With continued reference to the drawing the elongated, cylindrical or tubular quill 10 constitutes the principal structural member of the improved handle. This quill is provided on one end portion thereof with spaced partly circumferential ridges 11 and on the opposite end portion with external screw threads 12. The ridged end portion of the quill receives a plug or dowel 13 permanently secured therein and provided with a well or recess 14 opening to one end thereof which provides a socket for the butt end of a conventional fishing rod. The plug 13 may be conveniently formed of wood or some other suitable material, such as a synthetic resin plastic, while the quill 10 is preferably formed of a strong, corrosion-resisting metal, such as aluminum, stainless steel, copper, etc. The corresponding end of the quill 10 is rounded over the rounded end of the plug 13, as indicated at 15, and a dome-shaped end-closure cap 16 is fitted over and permanently secured to the rounded end-portion of the quill, both the cap and the quill end being apertured to provide an opening into the well 14. One portion of the end cover cap 16 is bent away from the adjacent portion of the quill to provide a reel foot recess or reel seat, as indicated at 17.

A reel clamp ring 18 surrounds the quill 10 and is engageable with the ridges 11 to firmly secure a reel in place on the end portion of the quill in which the dowel or plug 13 is received.

A tubular grip 19, preferably formed of a synthetic resin plastic, is provided on the exterior of the quill between the plug-receiving-end portion and the external screw thread 12 and end washers 20 are provided, one at each end of the grip 19, surrounding the quill at the ends of the grip to provide a smooth and attractive finish at the ends of the tubular grip.

An end cap or closure 21 having a substantially straight end-wall and an internally-screw-threaded annular portion is threadable upon the screw threads 12 and an elongated cylindrical container 22, formed of thin metal, synthetic resin plastic, or other suitable material, has one end thereof secured to the inner-surface of the end-wall of the cap 21 and is provided at its opposite end with an integral end-wall 23. This container is provided with a longitudinally-extending, substantially rectangular side opening 24 the ends of which are spaced from the ends of the receptacle and a lid or cover 25 is hinged along one longitudinal edge to the receptacle at a longitudinal edge of the opening 24 by suitable hinges 26 the eyes of which are preferably formed integrally with the receptacle and the cover. The free edge of the cover is provided with a longitudinal indentation 27 which cooperates with a longitudinal indentation 28 provided in the receptacle along the edge of the opening opposite the edge at which the hinges 26 are provided, to releasably latch the cover in closed position relative to the receptacle, as illustrated in full lines in Figure 3. To open the receptacle the cover or closure 25 is unlatched and turned about its hinged connection with the receptacle, as indicated in dotted lines in Figure 3.

A washer 29 of suitable flexible material is disposed surrounding the end of the receptacle at the inner-surface of the end-wall of the cap 21 in position to be compressed between the cap end-wall and the corresponding end of the quill 10 when the cap is threaded onto the end of the quill, as shown in Figure 1, to provide a water-tight seal between the cap and the quill so that water will not leak into the interior of the quill and into the receptacle 22.

When the cap 21 is screwed off of the end of the quill the cap and receptacle may be removed as a unit from the quill and after the unit has been removed the closure 25 of the receptacle may be opened to afford access to the interior of the receptacle. The closure prevents damage to articles contained in the receptacle while the receptacle is being inserted into or removed from the hollow handle.

If it is desired to use the interior of the hollow handle for another purpose, as for containing a long cylindrical spool, a plain cap may be provided in place of the cap 21 to which the receptacle 22 is attached in which case the receptacle 22 will not be used.

As the improved handle is of extreme strength and durability it may be conveniently used for various purposes, such as for "staking-out" a fishing rod and line. This may be accomplished by pressing a stake into the ground, removing the cap and receptacle from the handle and inserting the upper end of the stake into the hollow handle. The quill 10 being formed of a relatively hard metal of sufficient thickness to resist distortion, the handle will not split or become distorted to an extent such as to render it difficult to thread the end cap 21 thereon.

The invention may be embodied in other specific forms without departing from the spirit or essential characteristics thereof. The present embodiments are, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What I claim is:

A fishing rod handle comprising an elongated, cylindrical quill of substantially uniform diameter having at one end a rounded end wall provided with a substantially central opening and having a completely open opposite end, a plug in said quill coterminous with said one end of the latter and having a rod socket therein registering with said end wall opening, said plug having a rounded end conforming to the shape of said rounded end wall, an end cap secured on said one end of said quill and providing one component of a reel seat, a ring surrounding said quill at a location spaced from said end cap to provide another reel seat component, said plug extending past said ring to reinforce the reel receiving portion of said quill, a tubular grip surrounding said quill adjacent said opposite end, external screw threads on said quill adjacent said opposite end, and a screw cap threadable onto said screw threads to close said opposite end of the quill, said quill providing between said plug and said open end a receiver for a receptacle insertable through said opposite end of the quill when said screw cap is removed.

ELBIE A. STARK.

REFERENCES CITED

The following references are of record in the file of this patent:

UNITED STATES PATENTS

| Number | Name | Date |
|---|---|---|
| 461,106 | Oberly | Oct. 13, 1891 |
| 1,013,333 | Treadwell | Jan. 2, 1912 |
| 1,077,510 | Culver | Nov. 4, 1913 |
| 1,300,710 | Edwards | Apr. 15, 1919 |
| 1,518,205 | Kountz | Dec. 9, 1924 |
| 2,145,612 | Scogland et al. | Jan. 31, 1939 |
| 2,166,407 | Howarth | July 18, 1939 |